US012625064B2

(12) United States Patent
Kim et al.

(10) Patent No.: US 12,625,064 B2
(45) Date of Patent: May 12, 2026

(54) SPLIT PRISM SILICON-BASED LIQUID IMMERSION MICROCHANNEL MEASURING DEVICE AND METHOD

(71) Applicant: KOREA RESEARCH INSTITUTE OF STANDARDS AND SCIENCE, Daejeon (KR)

(72) Inventors: Dong Hyung Kim, Cheonan-si (KR); Hyun Mo Cho, Daejeon (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 201 days.

(21) Appl. No.: 18/604,754

(22) Filed: Mar. 14, 2024

(65) Prior Publication Data

US 2024/0337591 A1 Oct. 10, 2024

(30) Foreign Application Priority Data

Apr. 4, 2023 (KR) ........................ 10-2023-0044345

(51) Int. Cl.
| | |
|---|---|
| *G01N 21/21* | (2006.01) |
| *G01N 21/552* | (2014.01) |
| *G01N 21/84* | (2006.01) |

(52) U.S. Cl.
CPC ......... *G01N 21/211* (2013.01); *G01N 21/554* (2013.01); *G01N 21/8422* (2013.01); *G01N 2021/213* (2013.01)

(58) Field of Classification Search
CPC ............. G01N 2021/213; G01N 21/21; G01N 21/211; G01N 21/553; G01N 21/554; G01N 21/8422

USPC ........................................................ 356/369
See application file for complete search history.

(56) References Cited

U.S. PATENT DOCUMENTS

2023/0168185 A1* 6/2023 Cho ........................ G01N 21/11
356/369

FOREIGN PATENT DOCUMENTS

| | | |
|---|---|---|
| JP | 5033820 B2 | 9/2012 |
| JP | 2013-083449 A | 5/2013 |
| KR | 10-1383652 B1 | 4/2014 |
| KR | 10-2019-0080999 A | 7/2019 |
| KR | 10-2022-0038962 A | 3/2022 |
| WO | WO-2022059824 A1 * | 3/2022 ........... G01N 21/211 |

* cited by examiner

*Primary Examiner* — Sunghee Y Gray
(74) *Attorney, Agent, or Firm* — Bridgeway IP Law Group, PLLC; Jihun Kim

(57) ABSTRACT

A split prism silicon-based immersion microchannel measuring device includes a microchannel structure including a support and one or more microchannels formed in the support and each having a sample detection layer with a fixed bioadhesive material for detecting a sample, a sample injection unit configured to inject a buffer solution containing the sample into the microchannel, a prism unit having a first prism and a second prism and formed by connecting a vertical surface of the first prism and a vertical surface of the second prism, a blocking part provided in a portion where the first prism and the second prism are connected to each other, the blocking part being configured to block an optical path, a polarized light generating unit configured to generate polarized light, and a polarized light detecting unit configured to detect a polarization change of reflected light.

14 Claims, 13 Drawing Sheets

Wavelength of light source:532nm
Refractive index of buffer solution medium
: n=1.333, n=1.3332

BIO thin film self-assembled monolayer film
: t=4nm, n=1.45
Refractive index of substrate material
: n=4.1385, k=0.04119

(a)

(b)

SPLIT PRISM SILICON-BASED LIQUID IMMERSION MICROCHANNEL MEASURING DEVICE AND METHOD

CROSS REFERENCE TO RELATED APPLICATION

The present application claims priority to Korean Patent Application No. 10-2023-0044345, filed on Apr. 4, 2023, the entire contents of which are incorporated herein for all purposes by this reference.

BACKGROUND OF THE INVENTION

Field of the Invention

The present disclosure relates to a split prism silicon-based immersion microchannel measuring device and method, and more particularly, to a split prism silicon-based immersion microchannel measuring device and method, in which a split prism is manufactured by joining portions of the prisms that adjoin each other based on the prisms made of two optical materials, and a second reflected light, which is reflected by an interface between a first prism and a buffer solution, is absorbed or scattered by a blocking part formed in a portion where the two prisms are joined in order to selectively detect only a first reflected light reflected by a sample detection layer.

Description of the Related Art

Reflectometry and ellipsometry are optical analysis techniques which measure a change of the reflectance or a polarization state of reflected light reflected from a surface of a sample and analyze the measured value to find a thickness and optical properties of the sample.

Measurement equipment using the same includes a reflectometer and an ellipsometer. The measurement equipment is utilized to evaluate thicknesses and physical properties of various nano-level thin films during a process of manufacturing a nano-thin film in a semiconductor industry. Further, efforts are continuing to expand an application range to a bio-industry to apply them to interface analysis of biomaterials such as proteins, DNA, viruses, and new drug materials.

The reflectometer of the related art is sufficient to evaluate a thickness and a physical property of a nano-thin film having a size of several nanometers (nm) or larger. However, there is a problem in that measurement sensitivity for analyzing a low molecular weight biomaterial requiring sensitivity in the range of approximately 1 to 0.001 nanometer is low so that the reliability is degraded. As compared with the reflectometer, the ellipsometer has measurement sensitivity of 0.01 nm or lower. Particularly, the measurement sensitivity is high in the condition that the refractive index is comparatively large as in the case of measuring the thickness of the oxide film having a relatively small refractive index as compared with the semiconductor on the high refractive index semiconductor substrate.

However, in order to analyze the low molecular biomaterial using the ellipsometer, a measurement method with improved sensitivity is required.

As a technique of the related art for improvement of the measurement sensitivity at the time of analyzing the biomaterial, a surface plasmon resonance sensor (hereinafter, referred to as an "SPR" sensor) in which reflectometry and a surface plasmon resonance technique are combined is known.

The surface plasmon resonance (SPR) phenomenon is known as a phenomenon that when electrons on a metal surface are excited by light waves to be collectively vibrated in a normal direction of the surface, light energy is absorbed at this time. It is known that the SPR sensor can not only measure the thickness and the refractive index change of the nano-thin film which is in contact with the metal surface using the surface plasmon resonance phenomenon sensitive to a polarization characteristic of the light, but also measure the change of an adsorption concentration of a biomaterial in a real time in a non-labeling manner which does not use a fluorescent material.

The SPR sensor is manufactured to have a structure in which a metal thin film of several tens of nanometers is coated on a material such as glass and a biomaterial can be bonded thereto and uses a principle that when a sample dissolved in a buffer solution is bonded to the sensor, a resonance angle is changed. The resonance angle is obtained by measuring the reflectance. When light is incident onto the SPR sensor, the glass material serves as an incident medium and the light passes through a thin film layer to which the biomaterial is bonded so that the buffer solution finally serves as a substrate.

With this structure, a refractive index of the buffer solution corresponding to the substrate material directly affects the shift of the resonance angle as well as the change of the biological thin film layer by the adhesion of the sample to be measured. Therefore, in order to measure only pure binding kinetics, the refractive index of the buffer solution needs to be independently measured and corrected.

In order to correct the change of the refractive index of the buffer solution and prevent the error due to the diffusion between the sample and the buffer solution, a method of correcting the error using a delicate valve device, an air injecting device, and two or more channels in which one is used as a reference channel has been used. However, it is difficult to distinguish the SPR angle change due to the change of the refractive index of the buffer solution from an SPR angle change due to the pure adsorption and dissociation characteristic, and this may always act as a factor causing a measurement error. Consequently, due to the limitation of the measurement method as described above, the SPR sensor of the related art has a fundamental difficulty in measuring the adsorption and dissociation characteristic of a material having a small molecular weight such as a small molecule.

Further, the SPR sensor of the related art uses a metal thin film of precious metal such as gold (Au) and silver (Ag) for surface plasmon resonance so that the manufacturing cost of the sensor is expensive. Further, the metal thin film has problems in that the surface roughness is uneven in accordance with the manufacturing process so that the variation of the refractive index is severe, it is difficult to quantitatively measure the biomaterial due to the unstable optical property, and errors caused by different sensitivity characteristics of different positions are included as relatively compared with the reference channel.

In order to improve the disadvantages of the SPR sensor, when a biomaterial adhesive sensor layer is formed on a substrate material such as silicon and an amplitude and a phase of light which passes through a buffer solution under an immersion microchannel environment to be reflected onto the substrate material are measured by the ellipsometry under a p-polarized wave non-reflection condition, a signal that the measured amplitude is insensitive to the change of the refractive index of the buffer solution but is sensitive to the binding kinetics of the biomaterial may be obtained. When the junction characteristic of the biomaterial adsorbed onto the substrate material under the immersion microchannel environment is measured, contrary to the SPR measurement, the buffer solution serves as an incident medium and light which passes through the biomaterial adsorption layer is reflected from the substrate material.

Under this measurement condition, a measured ellipsometric angle $\Psi$ indicating the measured amplitude is insensitive to the change of the refractive index of the incident medium which is a buffer solution, but is sensitive only to the change of the bio thin film and the substrate material. In the case of a substrate having a stable refractive index, such as silicon, the measured ellipsometric angle $\Psi$ obtains a signal which is sensitive only to the change of the bio thin film. In a case in which a prism incidence structure illustrated in FIG. 1 is used, an ellipsometric angle $\Delta$ indicating a phase represents a signal which is sensitive only to the refractive index of the buffer solution so that the thickness of the bio thin film and the refractive index of the buffer solution may be simultaneously measured. However, when using a substrate parallel to a planar incidence structure such as a prism, the light reflected from the interface between the prism and the buffer solution needs to be removed and only the light reflected from the substrate needs to be used. In order to minimize a usage amount of the sample, the interval between a prism surface and the substrate material needs to be reduced. In this case, two reflected light are located to be very close, so that it is difficult to separate the light and the light serves as a measurement error. Therefore, a measurement method with a new structure for distinguishing light reflected from the interface between the prism and the buffer solution in a planar incident structure such as a prism from light reflected from the substrate material including a sensor is required.

Korean Patent No. 10-1383652 (entitled 'Device and Method for Simultaneously Measuring Molecule Junction Characteristics and Buffer Solution Refractive Index') discloses a device for simultaneously measuring molecule junction characteristics and buffer solution refractive index, the device including: a microchannel structure including a substrate having a support and a semiconductor or dielectric material formed on the support, a cover part having a prism structure and installed on the support, and a microchannel formed in any one of an upper portion of the support and a lower end of the cover part; a sample injection part configured to inject a buffer solution containing a sample made of a biomaterial into the microchannel to form an adsorption layer of the sample on a substrate; a polarization generation part configured to emit incident light, which is polarized by an incident surface of the prism, to the adsorption layer at an incident angle that satisfies a p-wave non-reflection condition; and a polarization detection part configured to detect a polarization change of reflected light when the reflected light from the adsorption layer enters through a reflective surface of the prism.

Japanese Patent No. 5033820 (entitled "Total Reflection Microscope Device and Fluorescence Sample Analysis Method") discloses a total reflection microscope device including a substrate configured to retain a fluorescence sample solution, a prism, an excitation light source configured to emit excitation light, and a measurer configured to detect fluorescence, in which a temperature adjustment device is disposed between the prism and a substrate such that the excitation light, which passes through the prism and the temperature adjustment device and enters the substrate, is totally reflected by an interface between the substrate and the sample solution, and in which in the temperature adjustment device, the passing portion of the incident light and the reflected light of the excitation light is made of a material that is less auto-fluorescent than the other portions.

DOCUMENTS OF RELATED ART (Patent Document 1) Korean Patent No. 10-1383652 (Apr. 3, 2014)
(Patent Document 2) Japanese Patent No. 5033820 (Jul. 6, 2012)

SUMMARY OF THE INVENTION

The present disclosure is proposed to solve these problems and aims to provide a split prism silicon-based immersion microchannel measuring device and method, in which a dual prism structure including a first prism and a second prism is applied, and first reflected light, which is reflected by a sample detection layer, and second reflected light, which is reflected by a first prism-buffer solution interface, are completely separated, such that the split prism silicon-based immersion microchannel measuring device and method may measure a bioadhesive material in a non-leveling manner under an immersion microchannel environment at high sensitivity and thus be widely utilized in various industries such as biological, medical, food, and environmental industries.

Technical problems to be solved by the present disclosure are not limited to the above-mentioned technical problems, and other technical problems, which are not mentioned above, may be clearly understood from the following descriptions by those skilled in the art to which the present disclosure pertains.

In order to achieve the above-mentioned object, a configuration of the present disclosure provides a split prism silicon-based immersion microchannel measuring device including: a microchannel structure including a support and one or more microchannels formed in the support and each having a sample detection layer with a fixed bioadhesive material for detecting a sample; a sample injection unit configured to inject a buffer solution containing the sample into the microchannel; a prism unit having a first prism and a second prism and formed by connecting a vertical surface of the first prism and a vertical surface of the second prism; a blocking part provided in a portion where the first prism and the second prism are connected to each other, the blocking part being configured to block an optical path; a polarized light generating unit configured to generate polarized light; and a polarized light detecting unit configured to detect a polarization change of reflected light, in which the polarized light defines incident light that passes through the first prism and enters a first prism-buffer solution interface on which the first prism and the buffer solution adjoin each other, in which a part of the incident light defines a first reflected light that passes through the first prism-buffer solution interface, is reflected by the sample detection layer, and passes through a second prism-buffer solution interface on which the second prism and the buffer solution adjoin each other, in which another part of the incident light defines second reflected light that is reflected by the first prism-buffer solution interface, and in which the second reflected light is absorbed, scattered, or reflected by the blocking part.

In the embodiment of the present disclosure, the blocking part may be a plate-shaped film, one surface of the blocking part may adjoin the vertical surface of the first prism, and the other surface of the blocking part may adjoin the vertical surface of the second prism.

In the embodiment of the present disclosure, the blocking part may be made of metal having an extinction coefficient of 0.5 or more and a thickness 20 mm or less.

In the embodiment of the present disclosure, the blocking part may be made of plastic having a thickness of 20 mm or less.

In the embodiment of the present disclosure, the blocking part may be a portion where the vertical surface of the first prism having surface roughness and the vertical surface of the second prism having surface roughness adjoin each other.

In the embodiment of the present disclosure, the vertical surface of the first prism and the vertical surface of the second prism each have surface roughness of 1 nm to 1 mm.

In the embodiment of the present disclosure, a part of the incident light may define transmitted light that passes through the buffer solution and enters the sample detection layer at an incident angle that satisfies a p-polarized wave non-reflection condition, and the transmitted light may define the first reflected light that is reflected by the sample detection layer and then passes through the second prism-buffer solution interface.

In the embodiment of the present disclosure, the sample detection layer may include: a substrate; a dielectric thin film formed on the substrate; and an adsorption layer formed on the dielectric thin film, and the bioadhesive material for detecting the sample may be fixed to the adsorption layer.

In the embodiment of the present disclosure, the substrate may be made of one or more materials selected from silicon, a dielectric material, or a semiconductor.

In the embodiment of the present disclosure, the polarized light detecting unit may calculate a thickness or concentration of the sample absorbed by the adsorption layer based on a polarization change of the first reflected light.

In the embodiment of the present disclosure, the polarized light generating unit may adjust a light amount of the incident light entering the first prism and control a shape of a beam spot of the incident light formed on the first prism-buffer solution interface.

In the embodiment of the present disclosure, the sample injection unit may inject gas, instead of the buffer solution, into the microchannel to measure a biomarker contained in air or the gas.

In the embodiment of the present disclosure, when the gas is injected into the microchannel, the polarized light may define incident light that passes through the first prism and enters a first prism-gas interface on which the first prism and the gas adjoin each other, and a part of the incident light may define the first reflected light that passes through the first prism-gas interface, is reflected by the sample detection layer, and passes through a second prism-gas interface on which the second prism and the gas adjoin each other.

In order to achieve the above-mentioned object, another configuration of the present disclosure provides a split prism silicon-based immersion microchannel measuring method including: a first step of injecting, by the sample injection unit, a buffer solution into the microchannel structure including at least one microchannel having the sample detection layer with the fixed bioadhesive material for detecting the sample; a second step of adsorbing the sample contained in the buffer solution to an antibody of the sample detection layer, a third step of generating polarized light by the polarized light generating unit; a fourth step of allowing the polarized light to define incident light that passes through the first prism and enters the first prism-buffer solution interface on which the first prism and the buffer solution adjoin each other; a fifth step of allowing a part of the incident light to define transmitted light that passes through the buffer solution and enters the sample detection layer at an incident angle that satisfies a polarized wave non-reflection condition and allowing another part of the incident light to define the second reflected light that is reflected by the first prism-buffer solution interface; a sixth step of allowing the transmitted light to define first reflected light that is reflected by the sample detection layer, passes through the second prism-buffer solution interface, on which the second prism and the buffer solution adjoin each other, and passes through the second prism and removing the second reflected light by the blocking part provided in a portion where the first prism and the second prism adjoin each other; a seventh step of detecting, by the polarized light detecting unit, a polarization change of the first reflected light; and an eighth step of detecting concentration of the sample adsorbed to the sample detection layer based on the polarization change of the first reflected light, in which the second reflected light is absorbed, scattered, or reflected by the blocking part such that only the first reflected light reflected by the sample detection layer is selectively detected.

DETAILED DESCRIPTION OF THE INVENTION

Figure 1:
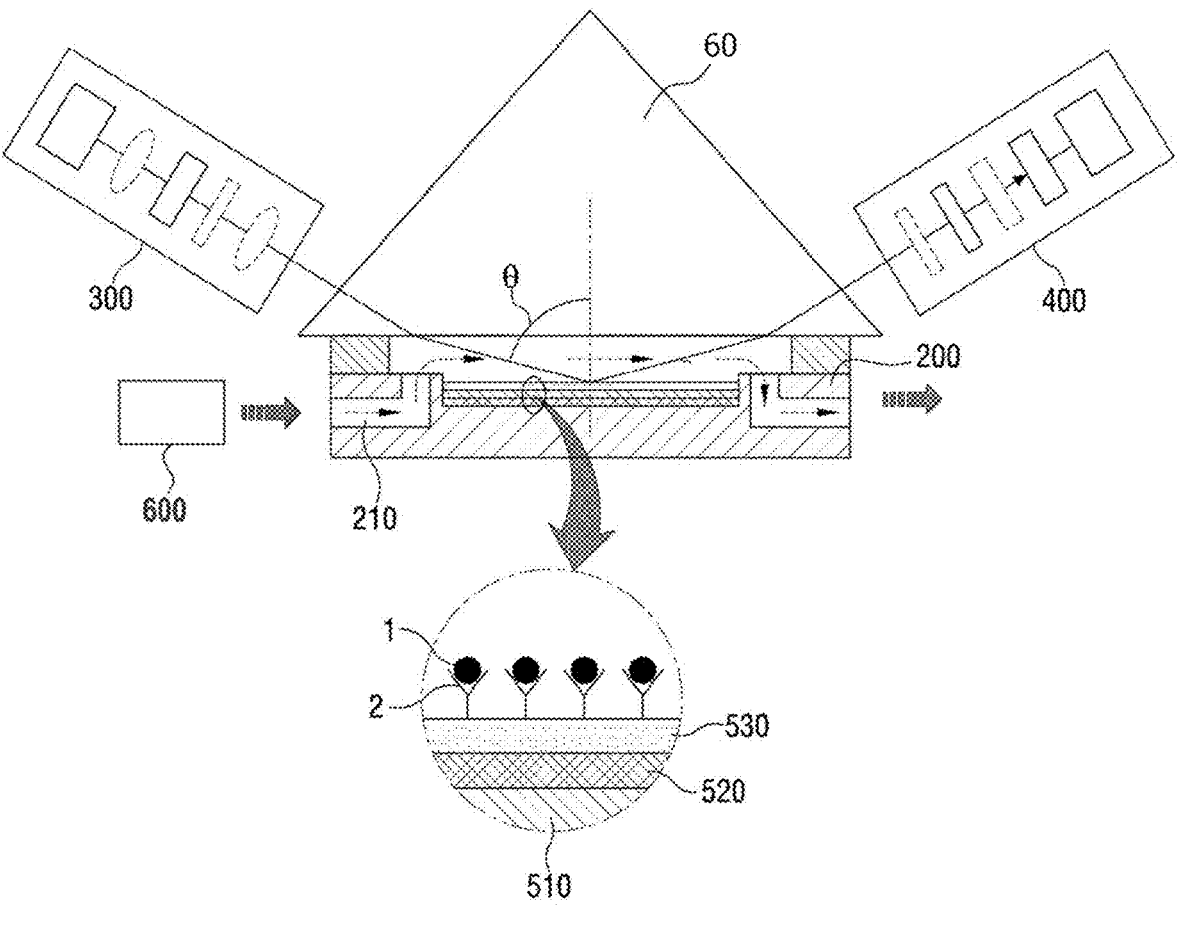
FIG. 1 is a cross-sectional view illustrating a sensor for measuring junction characteristics of a biomaterial according to the prior patent.

Hereinafter, the present disclosure will be described with reference to the accompanying drawings. However, the present disclosure may be implemented in various different ways and is not limited to the embodiments described herein. Further, a part irrelevant to the description will be omitted in the drawings in order to clearly describe the present disclosure, and similar constituent elements will be designated by similar reference numerals throughout the specification.

Throughout the present specification, when one constituent element is referred to as being "connected to (coupled to, in contact with, or linked to)" another constituent element, one constituent element can be "directly connected to" the other constituent element, and one constituent element can also be "indirectly connected to" the other element with other elements interposed therebetween. In addition, unless explicitly described to the contrary, the word "comprise/include" and variations such as "comprises/includes" or "comprising/including" will be understood to imply the inclusion of stated elements, not the exclusion of any other elements.

The terms used in the present specification are used only for the purpose of describing particular embodiments and are not intended to limit the present disclosure. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Hereinafter, the embodiment of the present disclosure will be described with reference to the accompanying drawings.

FIG. 1 is a cross-sectional view illustrating a sensor for measuring junction characteristics of a biomaterial according to the prior patent.

As illustrated in FIG. 1, a biomaterial junction characteristic sensor according to the prior patent is approximately configured by a prism 60, a microchannel structure 200, a polarized light generating unit 300, and a polarized light detecting unit 400.

In this case, the microchannel structure 200 of the biomaterial junction characteristic sensor according to the prior patent disposes an adsorption layer 530 on a substrate 510 or a dielectric thin film 520 to form an immersion microchannel 210 environment.

In this case, when the buffer solution 50 in which a sample 1 of the biomaterial is dissolved is injected into the microchannel 210, the biomaterial is adsorbed onto a ligand 2 material formed on a surface of the adsorption layer 530 to form an adsorption layer 530 having a predetermined thickness.

Further, the polarized incident light 10 generated from the polarized light generating unit 300 is incident onto the interface between the buffer solution 50 and the substrate 510 via an incident surface of the prism 60 at an angle which causes a p-polarized wave non-reflection condition.

In this case, the reflected light reflected by the substrate 510 includes optical data related to a refractive index of the adsorption layer 530 of the sample 1 and a refractive index of the buffer solution 50.

That is, when the sample 1 is adsorbed onto or dissociated from the ligand 2, a molecular binding and dissociation kinetics such as an adsorption concentration, a thickness or a refractive index of the adsorption layer 530, or a refractive index of the buffer solution 50 is changed and thus the measured ellipsometric angles vary.

Further, the reflected light including the optical data is detected by the polarized light detecting unit 400.

In this case, the polarized light detecting unit 400 measures the change in accordance with a polarized component of the reflected light, that is, the ellipsometric angles, to figure out the molecular binding and dissociation kinetics of the sample 1 and the refractive index of the buffer solution 50.

Figure 2:
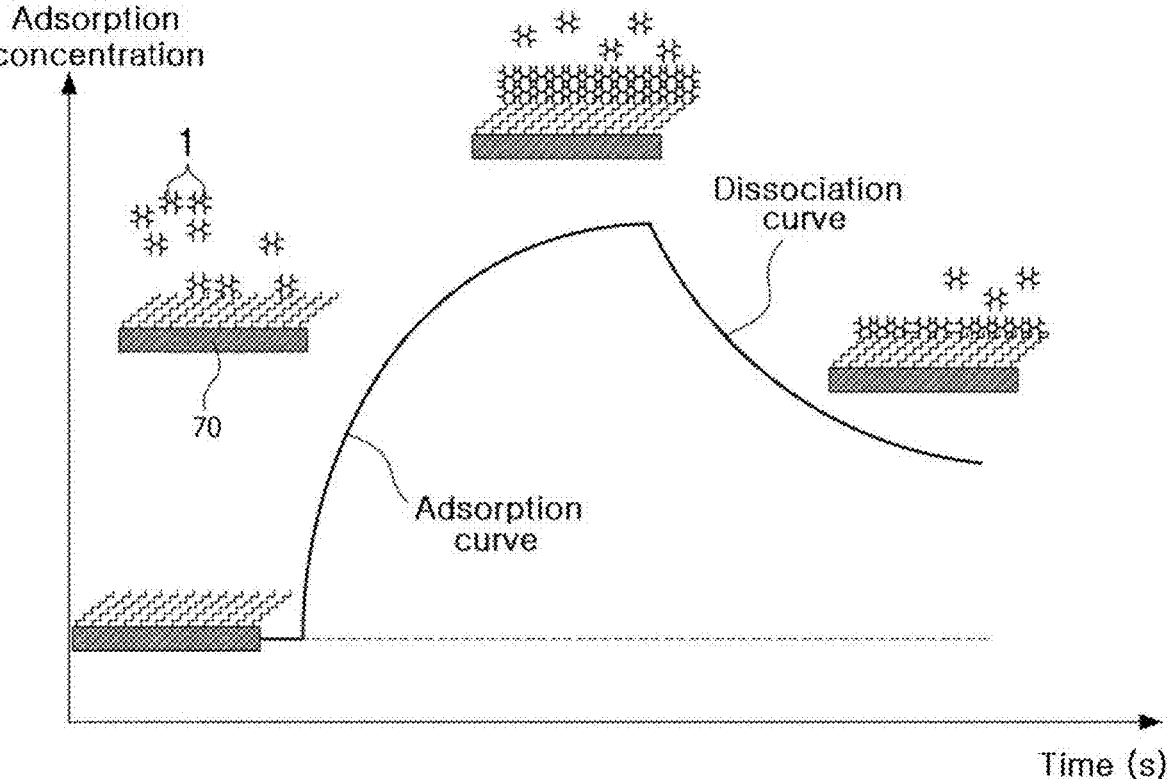
FIG. 2 is a schematic view illustrating a change in adsorption concentration during a process of adsorbing and dissociating a sample onto a metal thin film.

FIG. 2 is a schematic view illustrating a change in adsorption concentration during a process of adsorbing and dissociating the sample 1 onto a metal thin film 70.

FIG. 2 illustrates an adsorption curve indicating a process of adsorbing the sample 1 onto the metal thin film 70 and a dissociation curve indicating a dissociation process.

The larger the association rate constant ka, the faster the absorption of the biomaterial and the smaller the dissociation rate constant kd, the slower the dissociation.

That is, the association rate constant and the dissociation rate constant are measured to calculate a dissociation constant (KD=kd/ka) in an equilibrium state. For example, it is possible to determine whether a new drug candidate material having a low molecular weight which may be used as a carcinogenesis inhibitor can be used as a new drug by measuring a characteristic of the new drug candidate material which is associated onto or dissociated from a protein including a carcinogen-inducing factor.

Figure 3:
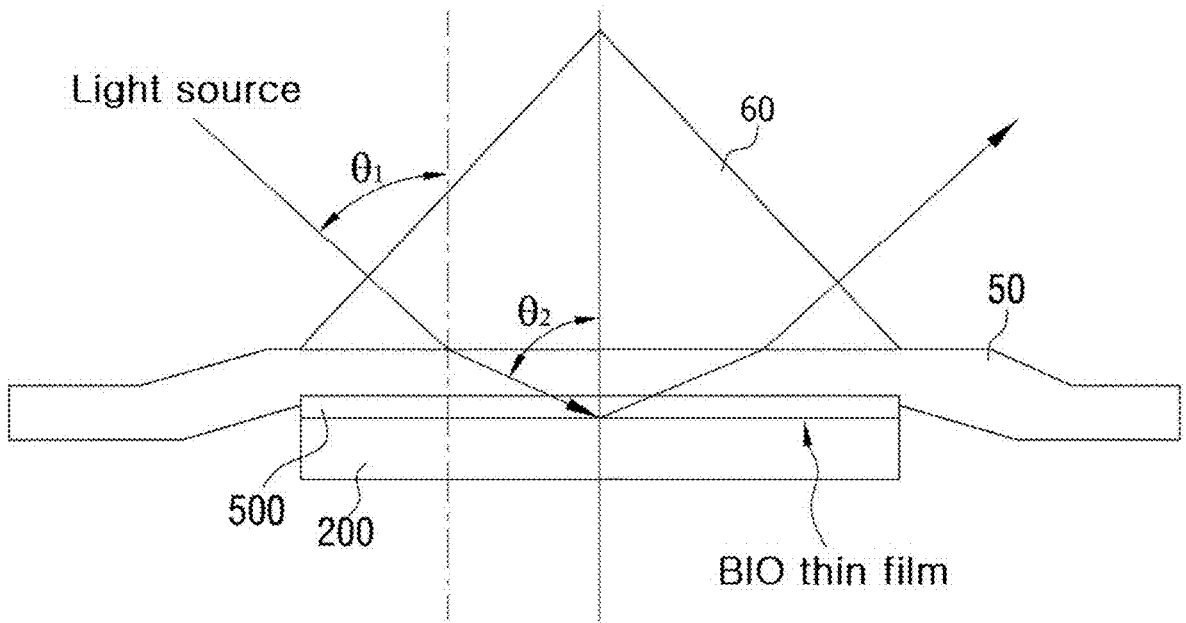
FIG. 3 is a schematic view of an immersion microchannel measurement sensor based on a prism incident-type silicon for explaining problems in the related art.

FIG. 3 is a schematic view of an immersion microchannel measurement sensor based on a prism incident-type silicon for explaining problems in the related art.

Figure 4:
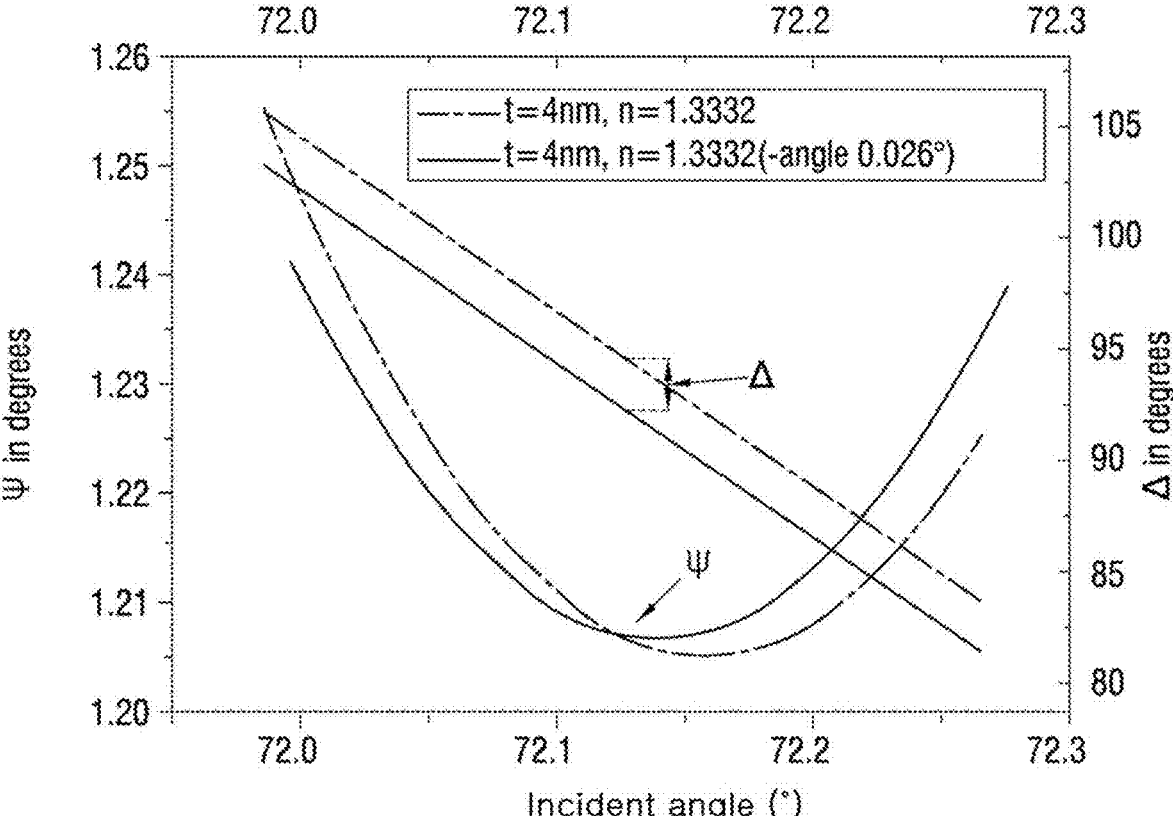
FIG. 4 is a graph obtained by measuring ellipsometric constants $\Psi$ and $\Delta$ according to adsorption of a biomaterial and a change in refractive index of a buffer solution using the sensor for measuring junction characteristics of a biomaterial according to the prior patent.

FIG. 4 is a graph obtained by measuring ellipsometric constants $\Psi$ and $\Delta$ according to adsorption of a biomaterial and a change in refractive index of the buffer solution 50 using the sensor for measuring junction characteristics of a biomaterial according to the prior patent.

Hereinafter, the characteristic and the limitation of the biomaterial analysis sensor according to the prior art will be described with reference to FIGS. 3 and 4.

When the light is incident using a prism incident structure as illustrated in FIG. 3, the light is incident onto the interface at an inclined angle of approximately 72.14° ($=\theta_2$) and when the light is incident from the prison onto the buffer solution 50 by the refractive index change (0.0002) of the buffer solution 50, the angle change may be approximately −0.026°.

The p-polarized wave non-reflection condition is approximately $\theta_2 = 72.14°$. However, the current angle due to the change of the refractive index of the buffer solution 50 is changed to 72.114° which is 0.026° smaller. Therefore, as illustrated in FIG. 4, a graph of $\psi$ and $\Delta$ is represented and the p-polarized wave non-reflection angle is hardly changed in accordance with the change of the refractive index so that values of $\Psi$ and $\Delta$ may be measured at 72.114° which is 0.26° smaller.

In FIG. 4, in a solid line graph when the buffer solution 50 has different refractive indexes, the refractive index of the buffer solution 50 is 1.3330 and the dotted line graph corresponds to the refractive index 1.3332 of the buffer solution 50. By the change of the refractive index of the buffer solution 50 when the prism structure is used, the change of the Ψ value is hardly represented, as illustrated in FIG. 4. However, Δ exhibits a large change.

The ellipsometric constant Δ for a phase difference is sensitively changed only by the change of the refractive index of the buffer solution 50 but is hardly affected by the junction characteristic, so that only the change of the refractive index of the buffer solution 50 may be measured with high sensitivity.

The smaller the thickness of the thin film material, the larger the change of the ellipsometric constant Δ. When the change of the refractive index is measured to be applied for an application study to analyze the change of the physical property or the junction characteristic of the material, it is possible to measure the refractive index with ultra-high sensitivity as compared with the SPR measurement method of the related art.

When a buffer solution 50 which is continuously supplied and a buffer solution 50 in which a refractive index is changed due to the solvent used for the sample 1 are supplied to the sensor through a microchannel 210, the pure binding kinetics and the change of the refractive index of the buffer solution 50 may be simultaneously measured.

However, as illustrated in FIG. 3, when the interval between a bottom surface of the prism and the substrate material is small, it is difficult to separate light reflected from the interface between the prism and the buffer solution 50 from light reflected from the substrate material.

Since, it is measured under the p-polarized wave non-reflection condition, there may be a problem in that a measurement error is caused due to intensity of the light reflected from the substrate material weaker than that of the light reflected from the interface between the prism and the buffer solution 50.

Further, there may occur additional problems in that super-sensitivity is required, and measurement sensitivity needs to be improved at the time of measuring extremely low concentration of a material contained in a medium in air.

Figure 5:
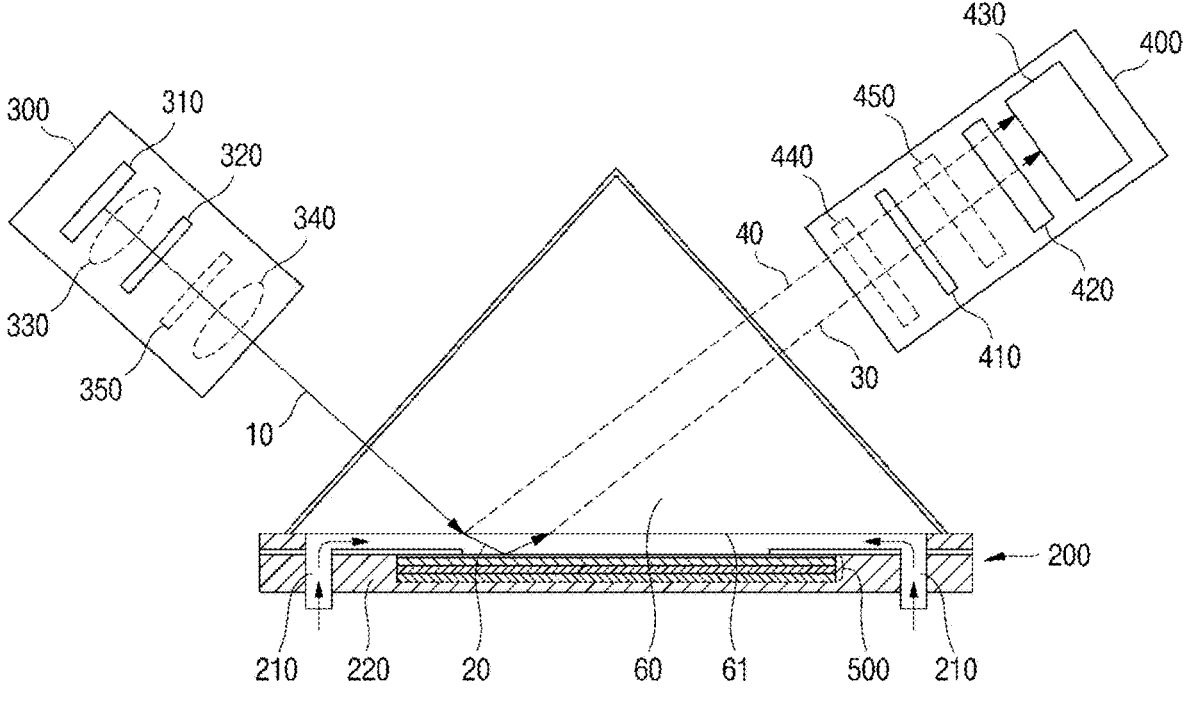
FIG. 5 is a schematic view of an immersion microchannel measuring device in the related art.

FIG. 5 is a schematic view of an immersion microchannel measuring device in the related art.

Specifically, FIG. 5 illustrates an immersion microchannel measuring device in the related art that does not use a blocking part 700 provided in the immersion microchannel measuring device of the present disclosure.

With reference to FIG. 5, because it is not easy to separate first reflected light 30 and second reflected light 40 in the immersion microchannel measuring device in the related art, both the reflected lights, i.e., the first reflected light 30 and the second reflected light 40 may enter the polarized light detecting unit 400.

In contrast, an immersion microchannel measuring device of the present disclosure may perform high-sensitivity measurement by applying a split prism structure.

Figure 6:
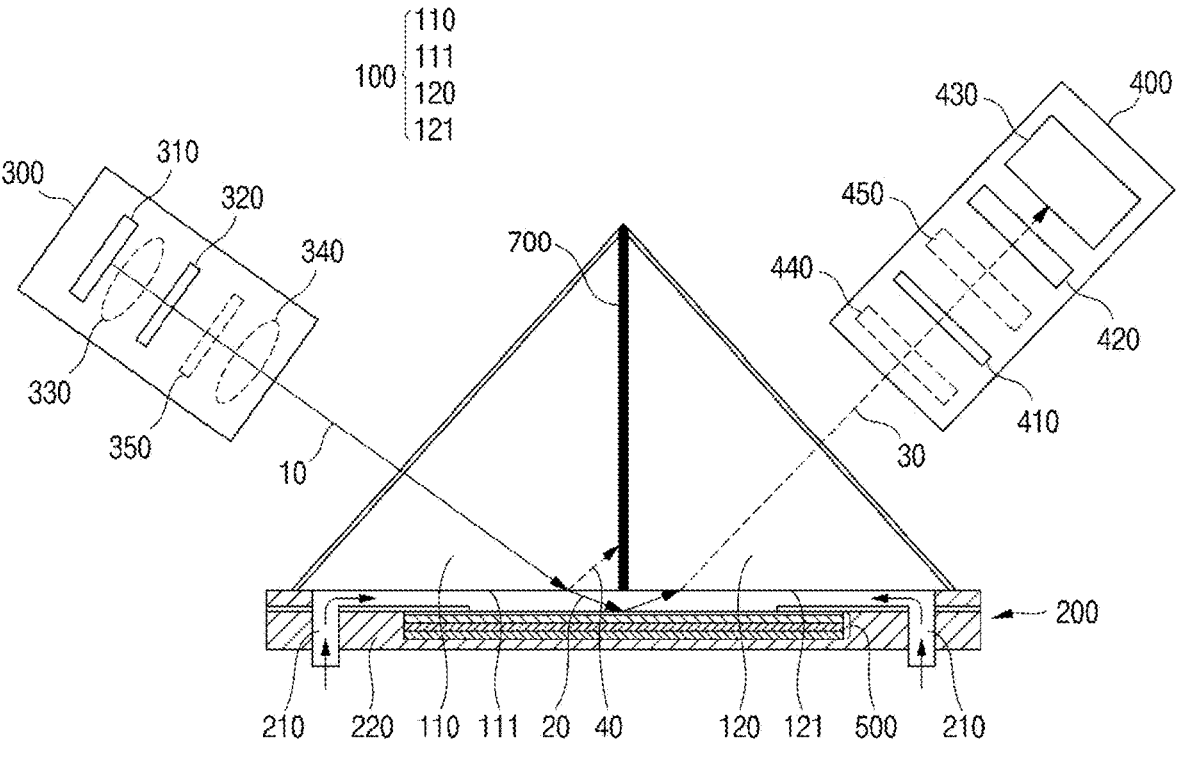
FIG. 6 is a schematic view of an immersion microchannel measuring device according to an embodiment of the present disclosure.

FIG. 6 is a schematic view of the immersion microchannel measuring device according to an embodiment of the present disclosure.

Specifically, in FIG. 6, the blocking part 700, which is provided in the immersion microchannel measuring device of the present disclosure, is formed in a plate shape and includes metal, which is a material that absorbs light, or plastic that is a material that may prevent transmission of light.

With reference to FIG. 6, the immersion microchannel measuring device of the present disclosure adopts the split prism structure and have the blocking part 700 in a portion where the prisms adjoin each other, such that the light, which is reflected by the interface between the prisms and the buffer solution 50, and the light reflected by the substrate material are completely separated, thereby enabling the high sensitivity measurement.

Figure 7:
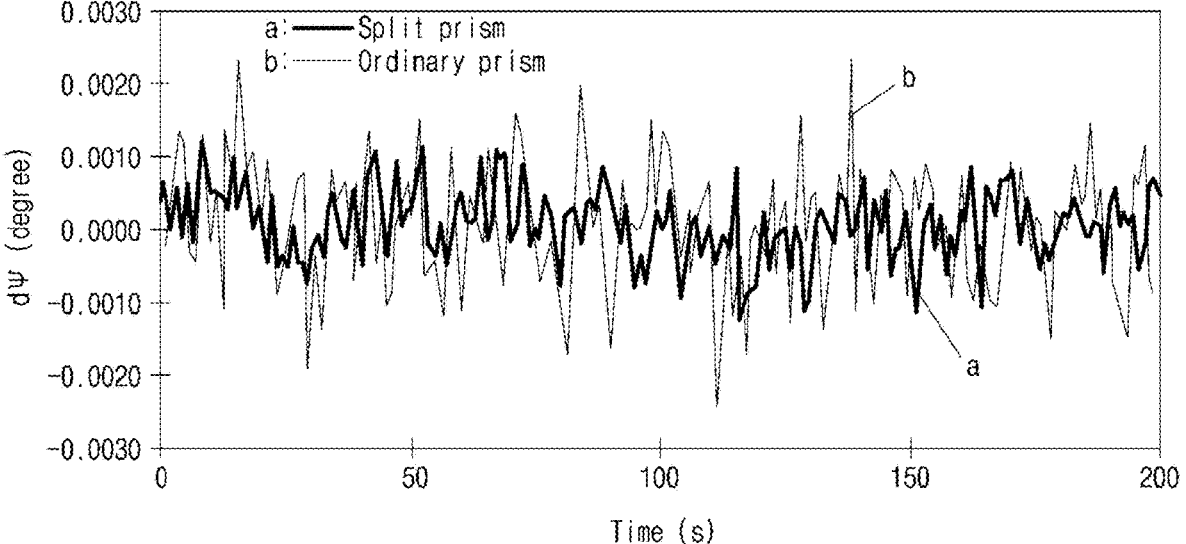
FIG. 7 is a graph illustrating data created by being detected by a photodetector of the immersion microchannel measuring device according to the embodiment of the present disclosure and a photodetector of the immersion microchannel measuring device in the related art.

FIG. 7 is a graph illustrating data created by being detected by a photodetector of the immersion microchannel measuring device according to the embodiment of the present disclosure and a photodetector 420 of the immersion microchannel measuring device in the related art.

Specifically, in FIG. 7, a represents data created by detecting light in the immersion microchannel measuring device of the present disclosure, and b represents data created by detecting light in the immersion microchannel measuring device in the related art.

Graph a and graph b is compared with reference to FIG. 7. In graph a, an amplitude is formed in a predetermined range, and the amplitude is formed to be relatively small. In graph b, an amplitude is formed in a range larger than that in graph a, and the amplitude is formed to be relatively large.

In this case, it can be seen that data in graph b have a larger amount of noise than data in graph a, an measurement error is generated in graph b in comparison with graph a, and noise is reduced by 60% or more in graph a in comparison with graph b.

Therefore, it can be seen that in case that the light, which is reflected by the interface between the prisms and the buffer solution 50, and the light reflected by the substrate material are received together, the measurement sensitivity of the immersion microchannel measuring device deteriorates.

Therefore, the immersion microchannel measuring device of the present disclosure will be described below in detail, and the immersion microchannel measuring device completely separate the light, which is reflected by the interface between the prisms and the buffer solution 50, and the light reflected by the substrate material, thereby enabling the high-sensitivity measurement and solving the above-mentioned problem in the related art.

With reference to FIG. 6, the immersion microchannel measuring device of the present disclosure includes: the microchannel structure 200 including a support 220 and at least one microchannel 210 formed in the support 220 and having a sample detection layer 500 with a fixed bioadhesive material for detecting the sample 1; a sample injection unit 600 configured to inject the buffer solution 50 containing the sample 1 into the microchannel 210; a prism unit 100 having a first prism 110 and a second prism 120 and formed by connecting a vertical surface of the first prism 110 and a vertical surface of the second prism 120; the blocking part 700 formed at a portion, where the first prism 110 and the second prism 120 are connected, and configured to block an optical path; the polarized light generating unit 300 configured to generate polarized light; and the polarized light detecting unit 400 configured to detect a polarization change of reflected light.

In this case, the polarized light may define the incident light 10 that passes through the first prism 110 and enters a first prism-buffer solution interface 111 on which the first prism 110 and the buffer solution 50 adjoin each other. A part of the incident light 10 may pass through the first prism-buffer solution interface 111, be reflected by the sample detection layer 500, and then pass through a second prism-buffer solution interface 121, which adjoins the second prism 120 and the buffer solution 50, to define the first reflected light 30. Another part of the incident light 10 may be reflected by the first prism-buffer solution interface 111 to define the second reflected light 40.

Further, the second reflected light 40 reflected by the first prism-buffer solution interface 111 may be absorbed, scattered, or reflected by the blocking part 700.

The first prism 110 and the second prism 120 may each be configured as a right-angled prism having a cross-section with a right-angled isosceles triangular shape.

Further, the vertical surface of the first prism 110 means a surface of the first prism 110 formed to be perpendicular to a surface being in contact with the microchannel structure 200. The vertical surface of the second prism 120 means a surface of the second prism 120 formed to be perpendicular to the surface being in contact with the microchannel structure 200.

That is, a portion of the first prism 110, which defines a right angle, and a portion of the second prism 120, which defines a right angle, are positioned to face each other, such that the first prism 110 and the second prism 120 are connected to each other.

Specifically, in the first prism 110 and the second prism 120, the portions of the first and second prisms 110 and 120, which define the right angles, are positioned to face each other, such that based on the portions of the first and second prisms 110 and 120 that define the right angles, one of the two surfaces at two opposite sides each of the first and second prisms 110 and 120 is positioned to be in contact with the microchannel structure 200, and the other surface of each of the first and second prisms 110 and 120 is positioned so that the first prism 110 and the second prism 120 are in contact with each other, such that the first prism 110 and the second prism 120 are connected.

In this case, the other surface of the first prism 110 and the other surface of the second prism 120 are respectively set to the vertical surface of the first prism 110 and the vertical surface of the second prism 120.

In addition, the blocking part 700 is provided in the portion where the vertical surface of the first prism 110 and the vertical surface of the second prism 120 are connected to be in contact with each other.

The above-mentioned operation will be described below in detail.

The immersion microchannel measuring device of the present disclosure measures the binding and dissociation kinetics of a bioadhesive material including a low molecular weight material using ellipsometry and has a structure in which a buffer solution (buffer) 50 including the sample 1 made of a bioadhesive material is injected into a microchannel structure 200.

In this case, the microchannel 210 in the microchannel structure 200 may be configured by a multi-channel.

Optical glass may be mainly used for the first prism 110 and the second prism 120. For example, the first prism 110 and the second prism 120 may each be BK7 or SF10, but the present disclosure is not limited thereto.

In addition, the first prism 110 and the second prism 120 may each be configured by assembling a plurality of unit prisms.

The blocking part 700 may be a plate-shaped film. One surface of the blocking part 700 may be in contact with the vertical surface of the first prism 110, and the other surface of the blocking part 700 may be in contact with the vertical surface of the second prism 120.

The blocking part 700 may be provided in the portion where the first prism 110 and the second prism 120 are in contact with each other, and the blocking part 700 may be made of a material capable of absorbing light or preventing the transmission of light or configured to scatter light. Therefore, the blocking part 700 may absorb or scatter the second reflected light 40 directed toward the blocking part 700.

Because the second reflected light 40 is removed by the blocking part 700, noise may be basically removed, such that only the first reflected light 30 reflected by the sample detection layer 500 may be selectively detected.

For example, the blocking part 700 may be made of metal having an extinction coefficient of 0.5 or more and a thickness of 20 mm or less.

Specifically, the blocking part 700 may be provided in the form of a metal plate made of any one or more materials selected from a group consisting of gold, silver, aluminum, iron, and stainless steel with an extinction coefficient of 0.5 or more when a light source 310 has a wavelength of 400 to 800 nm. The blocking part 700 has a thickness of 20 mm or less.

In another example, the blocking part 700 may be made of plastic having a thickness of 20 mm or less.

In the present disclosure, the blocking part 700 is described as being made of plastic or configured as a metal plate made of any one or more materials selected from a group consisting of gold, silver, aluminum, iron, and stainless steel. However, the present disclosure is not limited thereto. The blocking part 700 may be configured as a metal plate made of various materials having an extinction coefficient of 0.5 or more when the light source 310 has a wavelength of 400 to 800 nm.

Figure 8:
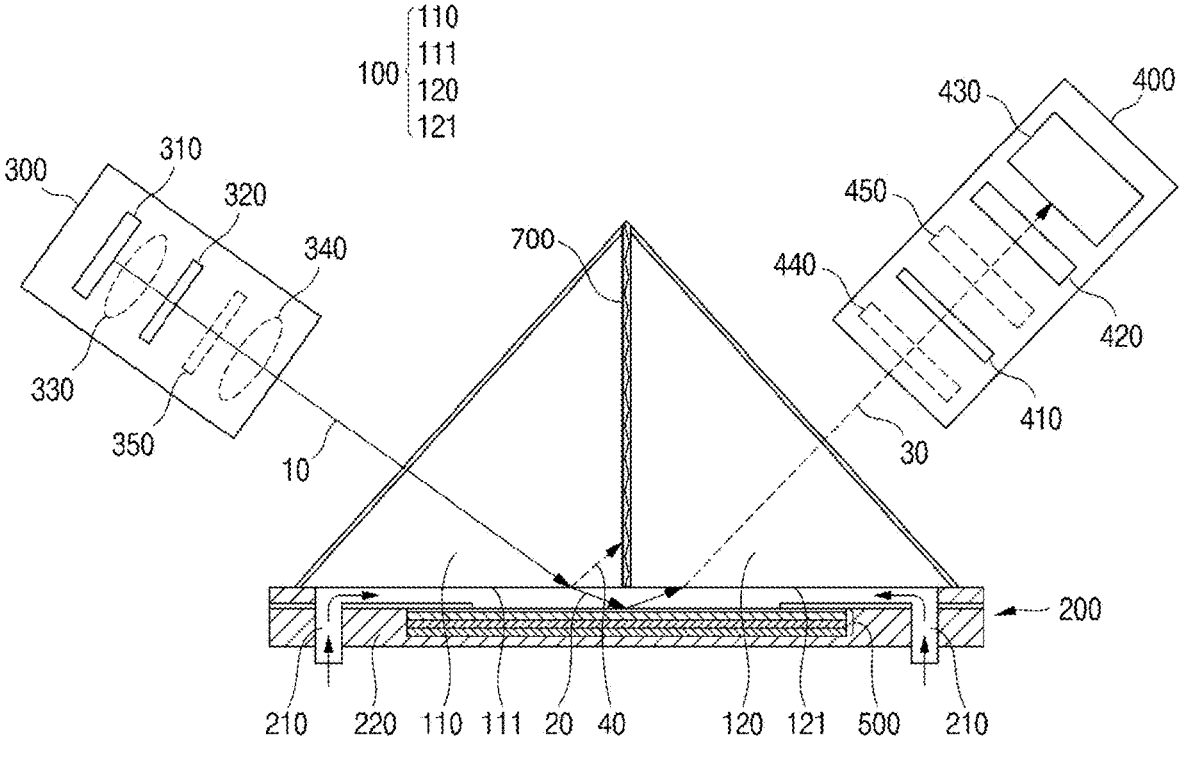
FIG. 8 is a schematic view of an immersion microchannel measuring device according to another embodiment of the present disclosure.

FIG. 8 is a schematic view of an immersion microchannel measuring device according to another embodiment of the present disclosure.

In still another example, with reference to FIG. 8, the blocking part 700 may be provided in a portion where a vertical surface of the first prism 110 having surface roughness and a vertical surface of the second prism 120 having surface roughness adjoin each other.

In this case, the vertical surface of the first prism 110 and the vertical surface of the second prism 120 may each have surface roughness of 1 nm to 1 mm.

The vertical surfaces of the first and second prisms 110 and 120 each have surface roughness to scatter light. In this case, the blocking part 700 may be formed as the portion itself where the first prism 110 and the second prism 120 adjoin each other, and the blocking part 700 may scatter light, such that the blocking part 700 may be substituted for the use of metal for absorbing light or plastic for preventing the transmission of light.

Meanwhile, the extinction coefficient is a constant related to the absorption of light, i.e, a constant that indicates the degree to which the amount of light is reduced by absorption when light passes through a layer of a material, and the inherent value of the extinction coefficient may vary depending on the absorbing material.

Figure 9:
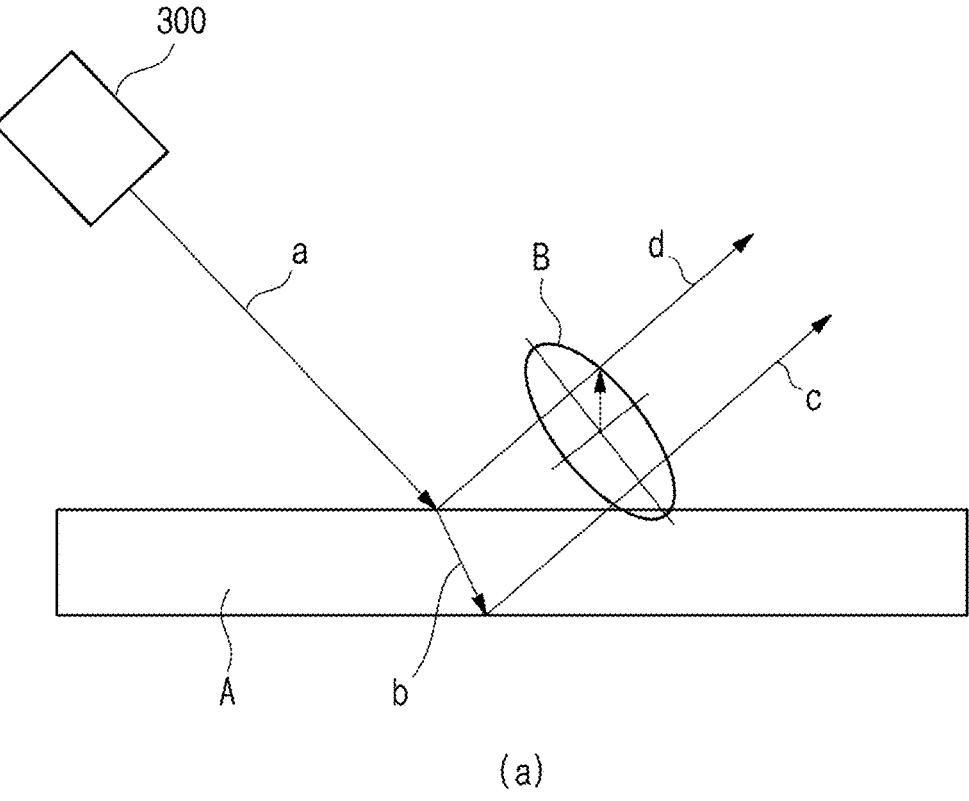
FIG. 9 is an image related to extinction coefficients of metals used to select a material of a blocking part provided in the immersion microchannel measuring device according to the embodiment of the present disclosure.
Figure 9:
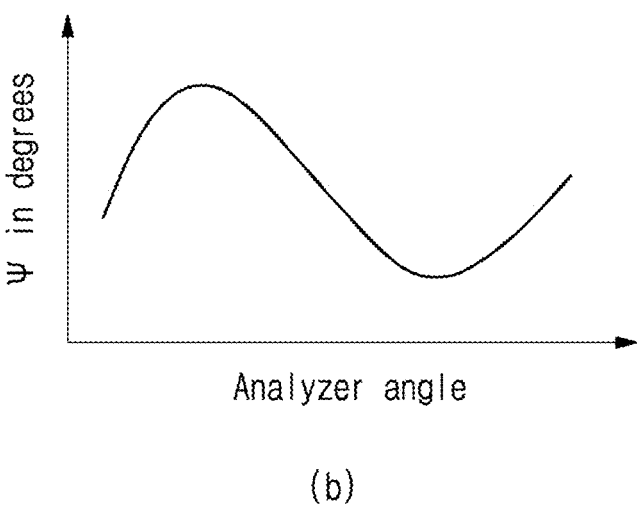

FIG. 9 is an image related to extinction coefficients of metals used to select a material of the blocking part 700 provided in the immersion microchannel measuring device according to the embodiment of the present disclosure.

Specifically, FIG. 9A is an image schematically illustrating a state in which light enters the metal plate, and FIG. 9B is a graph schematically illustrating a relationship between $\Psi$ and an angle of the spectrometer.

More specifically, in FIG. 9A, A represents a metal plate made of various metallic materials, B represents a lens, a represents incident light generated by the polarized light generating unit, b represents transmitted light defined by the incident light a is transmitted by the metal plate A, c represents first reflected light reflected by a bottom surface in the metal plate A after being transmitted by the metal plate A, and d represents second reflected light defined by the incident light a reflected by the metal plate A.

A complex refractive index will be described with reference to FIGS. 9A and 9B.

First, the reaction of a material to light varies depending on photon energy (wavelength) of light to be used.

Further, free electrons in a conductor, such as a metal, are free to move in response to an external electric field, whereas only constrained bound electrons are present in an insulator.

In this case, the constrained electrons are also affected by an external electric field. When visible light and light with photon energy (near IR, near UV) enters a material, the electric field of electromagnetic waves and the electrons in the material interact with one another, and most of the optical phenomena measured by ellipsometry are the result of the interaction of electrons.

It is possible to derive a complex refractive index ($\hat{n}$) of A by using a refractive index (n) and an extinction coefficient (k) of A.

Here, the complex refractive index, which is a constant representing the optical properties of an absorptive medium, may be derived from [Equation 1] below.

$$\hat{n} = n + ik \qquad \text{[Equation 1]}$$

(Here, n means a refractive index of metal A, and k means an extinction coefficient of metal A.)

In addition, the dielectric constant ($\varepsilon_r$) may be derived on the basis of [Equation 2] below.

$$\varepsilon_r = \varepsilon_1 + i\varepsilon_2 \qquad \text{[Equation 2]}$$

(Here, $\varepsilon$ means permittivity.)

The complex refractive index and the dielectric constant are related to [Equation 3] below.

$$\varepsilon_1 + i\varepsilon_2 = (n + ik)^2 \qquad \text{[Equation 3]}$$

(Here, n means a refractive index of metal A, k means an extinction coefficient of metal A, and $\varepsilon$ means permittivity.)

The above permittivity is a material constant that indicates the magnitude of the polarization created by a dielectric in response to an external electric field.

Based on the description above, the complex refractive index is proportional to the square root of the permittivity.

The dispersion of light in the prism will be described using this as an example. It can be ascertained that the light is dispersed when the light passes through the prism. The wavelength of the light is inversely proportional to the frequency, and the frequency is related to the permittivity.

In this case, because the complex refractive index is proportional to the square root of the permittivity, the light is divided depending on the wavelength when the light passes through boundaries between different materials.

Also, the use of i in the formula to derive the complex refractive index is because the refractive index is actually represented as a complex number, where the imaginary number represents attenuation in the material. That is, this means a decrease in intensity of light.

The microchannel structure 200 is disposed below the prism unit 100 and includes the one or more microchannels 210 each having the sample detection layer 500.

In this case, a bioadhesive material for detecting the sample 1 may be fixed to the sample detection layer 500.

Specifically, in the immersion microchannel measuring device of the present disclosure, the microchannel structure 200 may include the plurality of microchannels 210 that are passageways through which the buffer solution 50 containing the sample 1 may flow in or out.

In this case, a width of the microchannel 210 may be approximately several millimeters or a micro-scale of 1 mm or less.

In addition, the plurality of microchannels 210 may each include an inflow passage 210a, a micro-flow channel 210c, and an outflow passage 210b.

That is, the microchannel 210 may be configured by connecting the inflow passage 210a, the micro-flow channel 210c, and the outflow passage 210b.

Meanwhile, the sample injection unit 600 may inject the buffer solution 50 containing the sample 1 into the microchannel 210 or discharge the buffer solution 50.

The polarized light generating unit 300 may adjust the light amount of the incident light 10 entering the first prism 110 and control a shape of a beam spot of the incident light 10 formed on the first prism-buffer solution interface 111.

Specifically, the polarized light generating unit 300 may generate polarized light and include a light source 310 and a polarizer 320.

In addition, the polarized light generating unit 300 may include a collimating lens 330, a focusing lens 340, or a first compensator 350.

The polarizer 320 and the first compensator 350 may be rotatably configured or another polarized light modulating unit may be further included.

The incident light 10 may include both a polarized light component of the p-polarized wave and a polarized light component of the s-polarized wave. The polarizer 320 may be aligned with an angle close to the p-polarized wave in order to increase a signal-to-noise ratio (SNR). Particularly, ratios of the p-polarized wave and the s-polarized wave included in the first reflected light 30 received by the polarized light detecting unit 400 to be described below may be similar to each other.

Therefore, it is possible to control the shape of the beam spot of the incident light 10 formed on the first prism-buffer solution interface 111.

In the immersion microchannel measuring device of the present disclosure, the incident light 10 may enter the sample detection layer 500 at an incident angle θ that satisfies the p-polarized wave non-reflection condition.

A complex reflection coefficient ratio (ρ) in the ellipsometric equation may be represented by a ratio of a p-polarized wave reflection coefficient ratio (Rp) to an s-polarized wave reflection coefficient ratio (Rs), that is, ρ=Rp/Rs. The p-polarized wave non-reflection condition means a condition that the p-polarized wave reflection coefficient ratio (Rp) has a value close to 0.

The p-polarized wave non-reflection condition may be similar to the surface plasmon resonance condition of the SPR sensor of the related art and may be a condition that the measurement sensitivity of the present disclosure is maximized.

A part of the incident light 10 may define the transmitted light 20 that passes through the buffer solution 50 and enters the sample detection layer 500 at an incident angle that satisfies the p-polarized wave non-reflection condition. The transmitted light 20 may define the first reflected light 30 that is reflected by the sample detection layer 500 and then passes through the second prism-buffer solution interface 121.

Various types of lamps, light-emitting diodes (LEDs), solid-lasers, liquid-lasers, gas-lasers, and semiconductor laser diodes (LDs) including laser diodes, which emit monochromatic light or white light with an infrared, visible, or ultraviolet wavelength range, may be used as the light source 310.

In addition, the light source 310 may include a structure which varies a wavelength depending on a structure of an optical system.

In the meantime, an optical signal of reflected light may have relatively smaller intensity in the vicinity of the above-described p-polarized wave non-reflection condition. In this case, the high sensitivity measurement may be allowed by irradiating light at a high quantity using a laser having coherence to increase a signal-to-noise ratio.

The collimating lens 330 may receive the light from the light source 310 to provide parallel light to the polarizer 320.

Further, the parallel light, which passes through the polarizer 320, is converged by the focusing lens 340 to increase a quantity of the incident light 10.

Further, the first compensator 350 may serve to cause phase lag in the polarized component of the incident light 10.

The polarized light detecting unit 400 may calculate a thickness or concentration of the sample 1 adsorbed to the adsorption layer 530 based on a polarization change of the first reflected light 30.

Specifically, the polarized light detecting unit 400 may receive the first reflected light 30 and detect the polarization change of the first reflected light 30.

That is, the first reflected light 30 reflected by the adsorption layer 530 is received by the polarized light detecting unit 400, such that the change in polarization state of the first reflected light 30 may be detected.

The polarized light detecting unit 400 may include an analyzer 410, a photodetector 420, and a processor 430.

Further, the polarized light detecting unit 400 may include a second compensator 440 and a spectrometer 450.

The analyzer 410, which is a counterpart of the polarizer 320, has a polarizing plate to polarize again the first reflected light 30, thereby controlling a polarization degree of the reflected light or an orientation of a polarizing surface.

Further, the analyzer 410 may be rotatably configured depending on the structure of the optical system or may be further provided with a polarization modulating unit which may perform phase change or elimination of polarized components.

The photodetector 420 may server to detect the polarized first reflected light 30 to obtain optical data and convert the optical data into an electrical signal.

In this case, the optical data may include information on the change of the polarized state of the first reflected light 30.

The photodetector 420 may be a CCD-type solid state imaging element, a photomultiplier tube (PMT), or a silicon photodiode.

The processor 430 may receive the electrical signal from the photo detector 420 and deduct a measurement value.

The processor 430 includes a predetermined interpretation program using reflectometry and ellipsometry so that the processor 430 extracts and interprets the optical data converted to the electrical signal to deduct measurement values such as an adsorption concentration of the sample 1, a thickness of the adsorption layer 530, an adsorption constant, a dissociation constant, and a refractive index.

In order to improve the measurement sensitivity, the processor 430 may desirably deduct the measurement value by calculating the ellipsometric constants $\Psi$ and $\Delta$ for the phase difference of the ellipsometry.

With the embedded interpretation program, the above-mentioned measurement may be performed by using reflectance measurement in addition to the ellipsometry in the p-wave or s-wave non-reflection condition in the immersion microchannel measurement device according to the present disclosure.

The second compensator 440 delays the phase of the polarized component of the reflected light to control the polarized component.

The second compensator 440 may be rotatably configured or optionally include another polarization modulating unit.

The spectrometer 450 may be used when the light source 310 emits white light.

The spectrometer may be used to resolve the reflected light and separate reflected light having a wavelength in a narrow band to send the separated reflected light to the photodetector 420.

In this case, the photodetector 420 may be a two-dimensional image sensor such as a CCD-type solid state imaging element and may obtain optical data on distribution of the reflected light.

Hereinafter, the microchannel structure 200 will be described in more detail.

Figure 10:
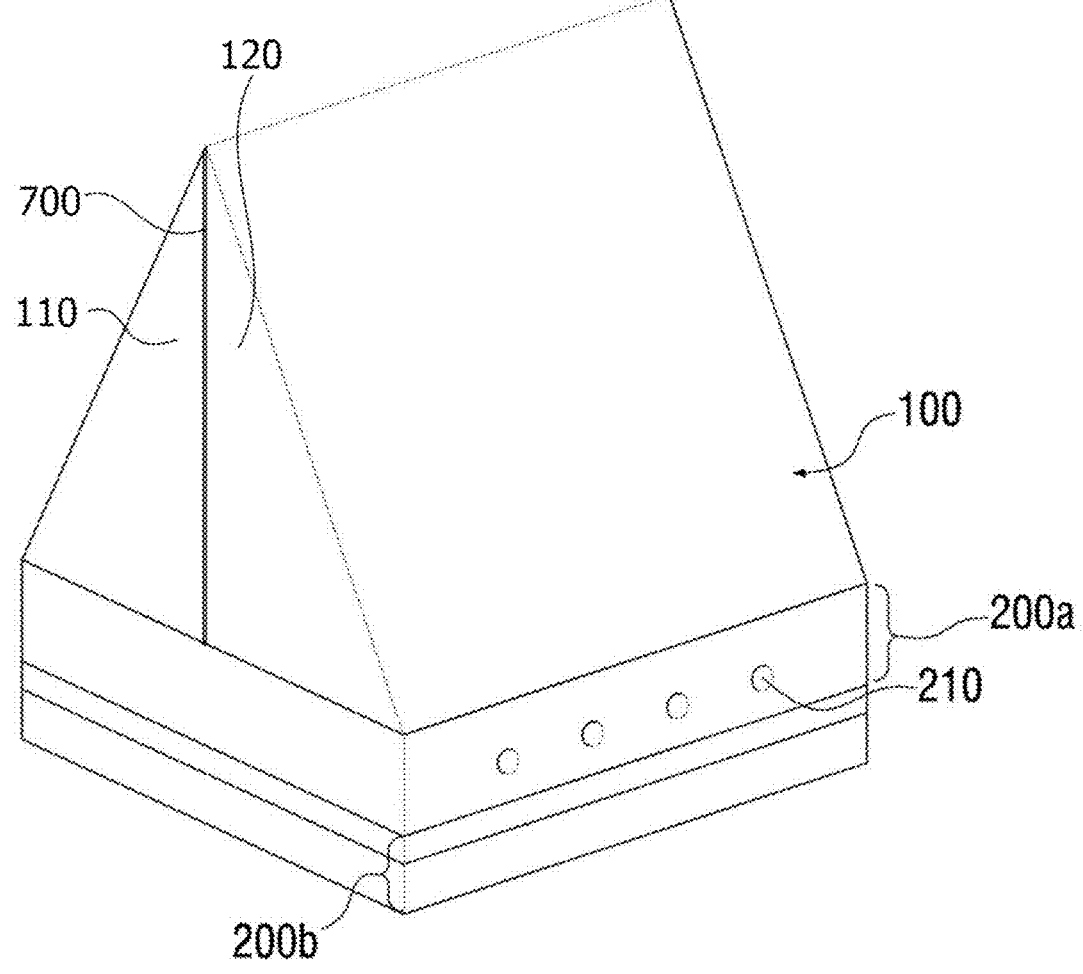
FIG. 10 is a perspective view of the immersion microchannel measuring device according to the embodiment of the present disclosure.

FIG. 10 is a perspective view of the immersion microchannel measuring device according to the embodiment of the present disclosure.

Figure 11:
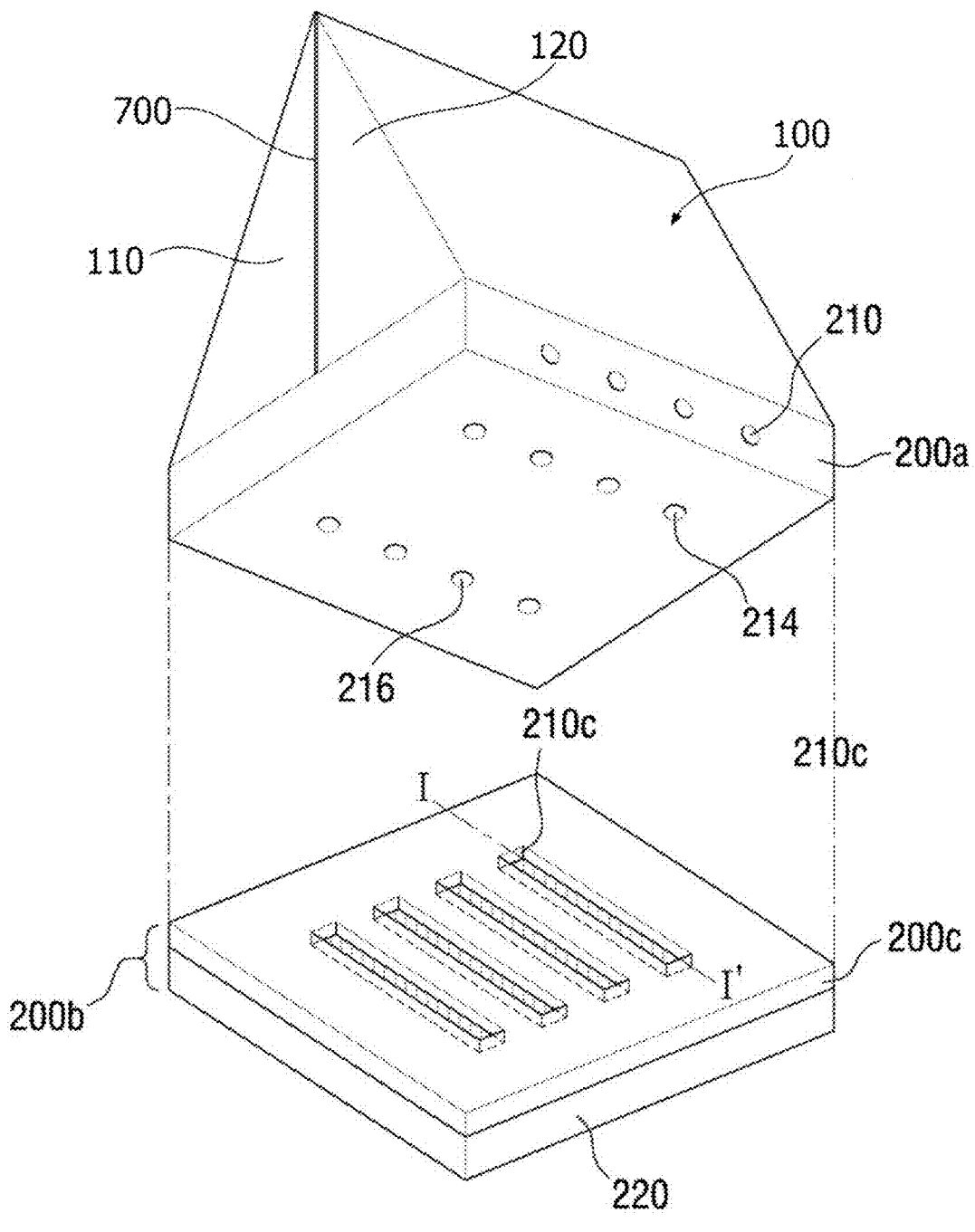
FIG. 11 is an exploded perspective view of the immersion microchannel measuring device according to the embodiment of the present disclosure.

FIG. 11 is an exploded perspective view of the immersion microchannel measuring device according to the embodiment of the present disclosure.

Figure 12:
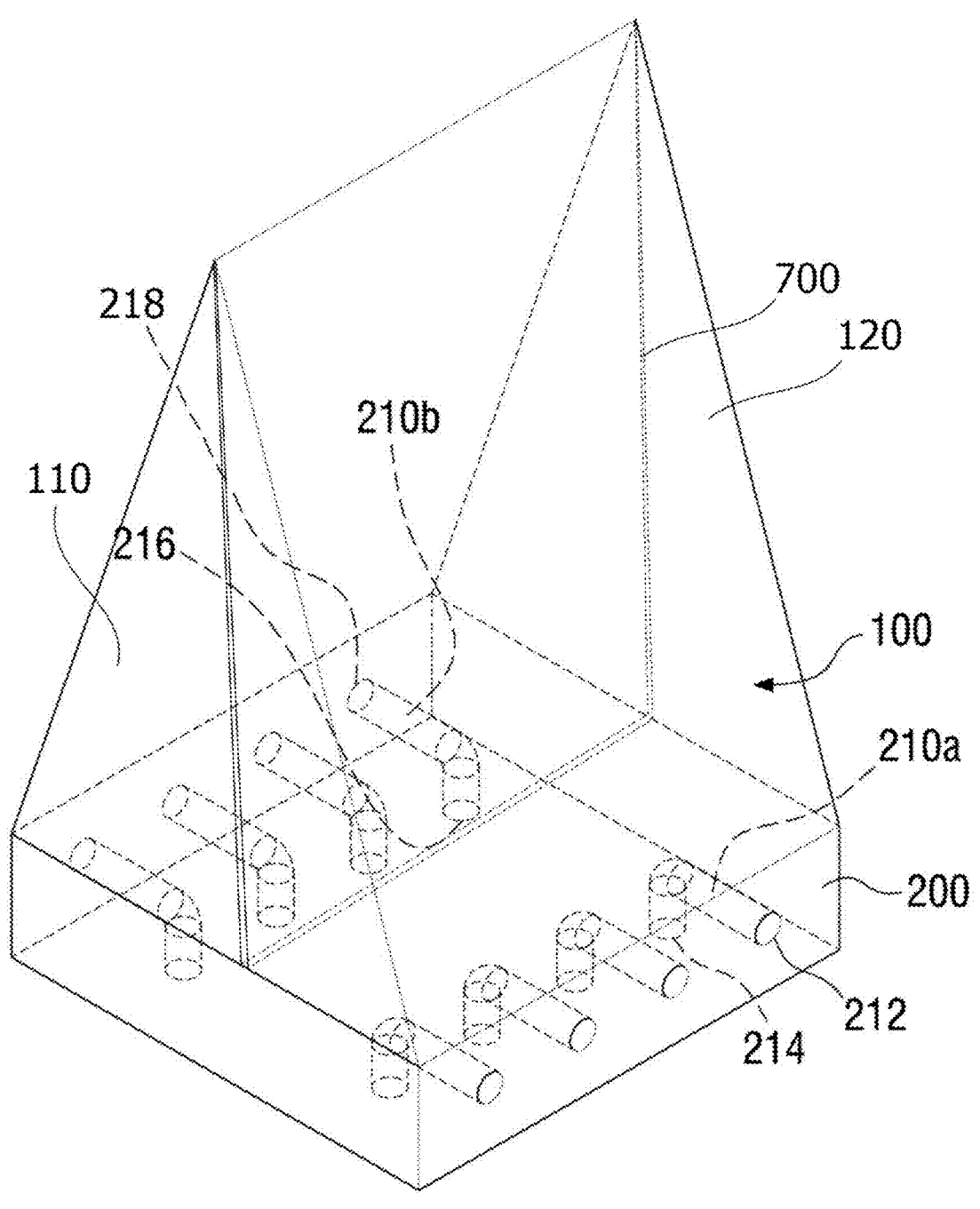
FIG. 12 is a transparent view illustrating a prism unit and a first structure according to the embodiment of the present disclosure.

FIG. 12 is a transparent view illustrating the prism unit 100 and a first structure 200a according to the embodiment of the present disclosure.

Figure 13:
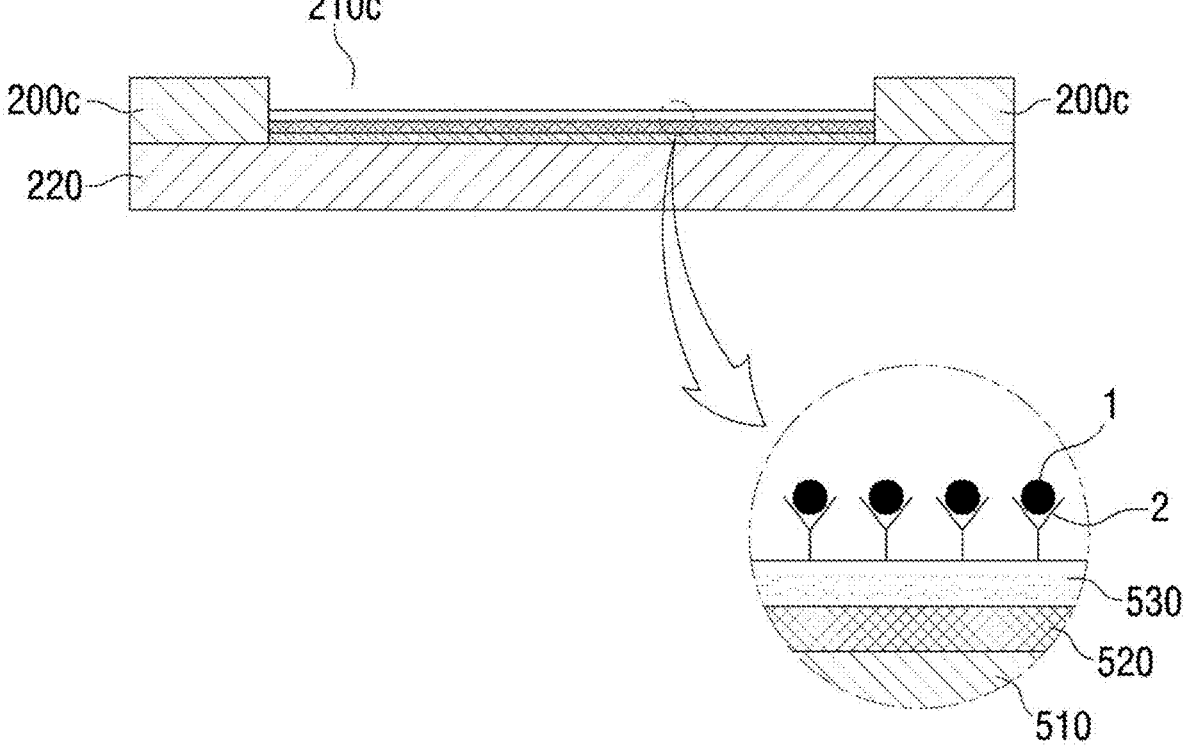
FIG. 13 is a cross-sectional view illustrating a second structure according to the embodiment of the present disclosure.

FIG. 13 is a cross-sectional view illustrating a second structure 200b according to the embodiment of the present disclosure.

As illustrated in FIGS. 10 to 13, the microchannel structure 200 according to the present disclosure may include the first structure 200a and the second structure 200b.

In this case, the first structure 200a may be provided below the prism unit 100.

In particular, in the microchannel structure 200 of the present disclosure, the prism unit 100 and the first structure 200a may be integrated, but the present disclosure is not limited thereto.

Further, the first structure 200a and the second structure 200b may be separated from each other, and the second structure 200b may include a micro-flow channel layer 200c.

Meanwhile, the first structure 200a may be made of a permeable material such as glass or a transparent synthetic resin material.

In this case, an example of a synthetic resin material includes an acrylic resin such as polymethyl methacrylate (PMMA).

Further, a silicon-based material such as polydimethylsiloxane (PDMS) may also be used.

Specifically, the first structure 200a may include a plurality of inflow passages 210a formed on one side of the first structure 200a and a plurality of outflow passages 210b formed on the other side of the first structure 200a.

Further, the inflow passage 210a may be connected from a first inlet port 212 formed on one side of the first structure 200a to a second inlet port 214 formed in a lower portion of the first structure 200a, and the outflow passage 210b may be connected from a first outlet port 216 formed in the lower portion of the first structure 200a to a second outlet port 218 formed on the other side of the first structure 200a.

Meanwhile, the plurality of inflow passages 210a and the plurality of outflow passages 210b may be formed to be connected to the plurality of micro-flow channels 210c of the micro-flow channel layer 200c formed in the second structure 200b.

Specifically, the second inlet port 214 may be formed to be in contact with one side of the micro-flow channel 210c to connect the first inflow passage 210a to the micro-flow channel 210c.

Further, the first outlet port 216 may be formed to be in contact with the other side of the micro-flow channel 210c to connect the outflow passage 210b to the micro-flow channel 210c.

That is, the microchannel 210 may be configured by connecting the inflow passage 210a, the micro-flow channel 210c, and the outflow passage 210b.

Therefore, the buffer solution 50 containing the sample 1 injected through the inflow passage 210a may pass through the micro-flow channel 210c and be discharged to the first outflow passage 210b.

In other words, the second structure 200b may include the micro-flow channel layer 200c, and the micro-flow channel layer 200c may include the plurality of micro-flow channels 210c.

In the meantime, the micro-flow channel layer 200c may be formed of an acrylic resin such as polymethyl methacrylate (PMMA), but the present disclosure is not limited thereto.

In addition, the second structure 200b may include the sample detecting layer 500 provided on a bottom surface of a groove formed by the plurality of micro-flow channels 210c.

The sample detecting layer 500 includes a substrate 510, a dielectric thin film 520 formed on the substrate, and an adsorption layer 530.

The substrate 510 may be made of one or more materials selected from silicon, a dielectric material, or a semiconductor.

In this case, when the substrate 510 is made of silicon, silicon provides constant and stable physical properties with low costs.

Further, when the substrate 510 is made of a semiconductor or dielectric material, the semiconductor or dielectric material is greatly different from a biomaterial in terms of refractive index, and the measurement sensitivity in the p-wave or s-wave non-reflection condition may be relatively increased in comparison with silicon.

In addition, the substrate 510 may have a complex refractive index of approximately 3.8391+i0.018186 at 655 nm.

The dielectric thin film 520 may be formed on the substrate 510.

The dielectric thin film 520 may be configured as any one of a transparent semiconductor oxide film and a glass film.

In addition, a thickness of the dielectric thin film 520 may be more than 0 and 10 mm or less.

An example of the most common dielectric thin film 520 is a silicon oxide film $SiO_2$ which is obtained by naturally oxidizing silicon to be grown to a thickness of several nanometers.

In this case, the refractive index of the silicon oxide film is approximately 1.456 at 655 nm which is significantly different from the refractive index of the substrate 510 formed of silicon and helps to increase the measurement sensitivity of the present disclosure.

Further, the dielectric thin film 520 may use a glass film formed of optical glass.

As described above, the dielectric thin film 520 which is formed of silicon, the silicon oxide film or the glass film may be manufactured to have a constant refractive index as compared with the metal thin film 70 such as gold and silver, thereby providing a stable optical property and lowering the production cost.

The adsorption layer 530 is formed on the dielectric thin film 520.

The adsorption layer 530 may be configured by at least one of a self-assembled thin film and a bio thin film.

Further, a bioadhesive material which may detect a specific sample 1 may be fixed to the adsorption layer 530.

In this case, the adsorption layer 530 may serve to adsorb or dissociate a sample 1 of a low-molecular weight bioadhesive material and reflect the transmitted light 20.

In other words, the sample 1 contained in the buffer solution 50 which flows through the inflow passage 210a may be adsorbed onto the adsorption layer 530 or dissociated from the adsorption layer 530.

The sample injection unit 600 may inject the buffer solution 50 containing the sample 1 into the microchannel 210 or discharge the buffer solution 50 containing the sample. In addition to the use of the buffer solution 50, gas may be used as a medium for the microchannel 210 in order to measure a biomarker contained in the gas.

In this case, air may be used as the gas. However, the present disclosure is not limited thereto. Another gas may be used instead of air.

In this case, the sample injection unit 600 may inject gas, instead of the buffer solution 50, into the microchannel 210 to measure a biomarker contained in air or the gas.

In case that the gas is injected into the microchannel 210, the polarized light may define the incident light 10 that passes through the first prism 110 and enters a first prism-gas interface where the first prism 110 and the gas adjoin each other. A part of the incident light 10 may define the first reflected light 30 that passes through the first prism-gas interface, is reflected by the sample detection layer 500, and then passes through the second prism 120-gas interface where the second prism 120 and the gas adjoin each other.

Even in this case, it is possible to obtain a high-sensitivity signal in the p-wave or s-wave non-reflection condition.

Hereinafter, an operation of the exemplary embodiment will be described in detail with reference to the accompanying drawings.

With reference to FIGS. 6 and 7, the vertical surface of the first prism 110 and the vertical surface of the second prism 120 may be connected to each other, and the blocking part 700 may be provided in the portion where the first prism 110 and the second prism 120 are connected to each other.

The incident light 10 may pass through the first prism 110 and enter the first prism-buffer solution interface 111.

On the first prism-buffer solution interface 111, the incident light 10 may be divided into the transmitted light 20 and the second reflected light 40.

The transmitted light 20 may define the first reflected light 30 that is reflected by the sample detection layer 500 and then passes through the second prism-buffer solution interface 121 and the second prism 120, and the second reflected light 40 may be absorbed or scattered by the blocking part 700.

As described above, the polarized light detecting unit 400 may derive information on physical properties related to the thickness or optical characteristics of the sample 1 by receiving the first reflected light 30 and analyzing the polarized state of the first reflected light 30.

However, as illustrated in FIG. 5, when the reflection structure 700 is not used, the first reflected light 30 and the second reflected light 40 are not easily separated, such that the entire reflected light, i.e., the first reflected light 30 and the second reflected light 40 may enter the polarized light detecting unit 400.

That is, in the related art, there is a problem in that it is difficult to separate the light reflected by a prism-buffer solution interface 61, i.e., the interface between the prism 60 and the medium from light which is refracted to be incident onto the adsorption layer 530, and accordingly, the light reflected by the prism-buffer solution interface 61 is refracted and is detected by the polarized light detecting unit 400 together with the light incident on the adsorption layer 530.

Therefore, a measurement error is caused by the light having a relatively high energy which is reflected by the prism-buffer solution interface 61 and the measurement sensitivity deteriorates.

In order to prevent the above-mentioned problem, as illustrated in FIGS. 6 and 8, the blocking part 700 is provided in the portion where the first prism 110 and the second prism 120 adjoin each other, such that the unnecessary light may be absorbed or scattered. Therefore, the second reflected light 40 formed by being reflected by the first prism-buffer solution interface 111 is removed, such that only the first reflected light 30 may be received by the polarized light detecting unit 400.

Therefore, it is possible to improve the measurement sensitivity of the microchannel measurement device according to the present disclosure by preventing a measurement error by basically removing noise.

As a result, the immersion microchannel measurement device according to the present disclosure may easily separate the unnecessary second reflected light 40 and the first reflected light 30 including information on the properties of the sample 1, thereby preventing the measurement error and easily analyzing the sample 1 with high sensitivity.

Hereinafter, an immersion microchannel measuring method using the immersion microchannel measuring device of the present disclosure will be described with reference to FIGS. 6, 8, and 10 to 13.

First, in a first step, the sample injection unit 600 may inject the buffer solution 50 into the microchannel structure 200 including the one or more microchannels 210 each having the sample detection layer 500 with the fixed bio-adhesive material for detecting the sample 1.

In this case, the sample injecting unit may inject the buffer solution 50 into each of the microchannels 210 with a time interval.

Further, the buffer solution 50 may be injected only into some of the microchannels 210 and the other microchannels 210 may not be used.

Next, in the second step, the sample 1 contained in the buffer solution 50 may be adsorbed to an antibody of the sample detection layer 500.

Alternatively, the sample 1 may be adsorbed on a plurality of adsorption layers 530 on a plurality of different self-assembled monolayer films or identical self-assembled monolayer films formed on the single microchannel 210c of FIG. 13 to form adsorption layers 530 having different junction characteristics.

Further, in a third step, the polarized light generating unit 300 may generate the polarized light.

Next, in a fourth step, the polarized light may define the incident light 10 that passes through the first prism 110 and enters the first prism-buffer solution interface 111 on which the first prism 110 and the buffer solution 50 adjoin each other.

Further, in a fifth step, a part of the incident light 10 may define the transmitted light 20 that passes through the buffer solution 50 and enters the sample detection layer 500 at an incident angle that satisfies the polarized wave non-reflection condition, and another part of the incident light 10 may define the second reflected light 40 that is reflected by the first prism-buffer solution interface 111.

Thereafter, in a sixth step, the transmitted light 20 may define the first reflected light 30 that is reflected by the sample detection layer 500, passes through the second prism-buffer solution interface 121, on which the second prism 120 and the buffer solution 50 adjoin each other, and passes through the second prism 120. The second reflected light 40 may be removed by the blocking part 700 provided in the portion where the first prism 110 and the second prism 120 adjoin each other.

In this case, the second reflected light 40 may be absorbed or scattered by the blocking part 700, such that only the first reflected light 30 reflected by the sample detection layer 500 may be selectively detected.

Next, in a seventh step, the polarized light detecting unit 400 may detect the polarization change of the first reflected light 30.

Further, in an eighth step, the concentration of the sample 1 adsorbed to the sample detection layer 500 may be detected based on the polarization change of the first reflected light 30.

More specifically, first, the analyzer 410 may receive the first reflected light 30 which is elliptically polarized on the adsorption layer 530 to pass only light according to the polarization characteristic.

Next, the photo detector 420 may detect the change of the polarized component of the first reflected light 30 to obtain predetermined optical data, convert the optical data into an electrical signal, and transmit the electrical signal to a processor 430.

Next, the processor 430 including a program using reflectometry or ellipsometry extracts and interprets the optical data converted to the electrical signal to deduct values such as an adsorption concentration of the sample 1, an adsorption and dissociation constant, a refractive index of the sample, and a refractive index of the buffer solution 50.

In this case, according to the immersion microchannel measuring device of the present disclosure, the processor 430 may calculate an ellipsometric constant $\Delta$ on a phase difference of the ellipsometry to measure a measurement value of a refractive index of the buffer solution 50 and measure an ellipsometric constant $\Psi$ on an amplitude ratio to calculate the binding kinetics.

This is because the ellipsometric constant $\Delta$ on a phase difference is only sensitive to the refractive index change of the buffer solution 50 and is less affected by the junction characteristics in the p-polarized wave non-reflection condition, so that the refractive index change of the buffer solution 50 may be only measured. Further, the ellipsometric constant $\Psi$ on an amplitude ratio is highly sensitive to the junction characteristics of the material.

Accordingly, the junction characteristics of the sample 1 contained in the buffer solution 50 to flow may be measured as $\Psi$ and simultaneously the refractive index change of the buffer solution 50 with the sample 1 dissolved therein or the refractive index change of the buffer solution 50 containing a solvent such as DMSO added for dissolving the sample may be determined as Δ, thereby determining only pure junction characteristics.

According to the effect of the present disclosure configured as described above, the dual prism structure including the first prism and the second prism is applied, and the first reflected light, which is reflected by the sample detection layer, and the second reflected light, which is reflected by the first prism-buffer solution interface, are completely separated, such that the split prism silicon-based immersion microchannel measuring device and method may measure a bioadhesive material in a non-leveling manner under an immersion microchannel environment at high sensitivity and thus be widely utilized in various industries such as biological, medical, food, and environmental industries. Unlike the measuring method in the related art in which a measurement error may occur because light, which is reflected by an interface between a prism and a measurement medium, is higher in energy than light reflected by a substrate material, and it is difficult to separate the light, the blocking part is provided in the portion, where the first prism and the second prism adjoin each other, and completely separates the light, which is reflected by the interface of the measurement medium, and the light reflected by the substrate material, thereby enabling the measurement related to different angles that vary depending on the change in refractive index.

The effects of the present disclosure are not limited to the above-mentioned effects, and it should be understood that the effects of the present disclosure include all effects that may be derived from the configuration of the present disclosure disclosed in the detailed description of the present disclosure or the appended claims.

It will be appreciated that the embodiments of the present disclosure have been described above for purposes of illustration, and those skilled in the art may understand that the present disclosure may be easily modified in other specific forms without changing the technical spirit or the essential features of the present disclosure. Therefore, it should be understood that the above-described embodiments are illustrative in all aspects and do not limit the present application. For example, each component described as a single type may be carried out in a distributed manner. Likewise, components described as a distributed type can be carried out in a combined type.

The scope of the present disclosure is represented by the claims to be described below, and it should be interpreted that the meaning and scope of the claims and all the changes or modified forms derived from the equivalent concepts thereto fall within the scope of the present disclosure.

DESCRIPTION OF REFERENCE NUMERALS

| | |
|---|---|
| 1: Sample | 2: Ligand |
| 10: Incident light | 20: Transmitted light |
| 30: First reflected light | 40: Second reflected light |
| 50: Buffer solution | 60: Prism |
| 61: Prism-buffer solution interface | |
| 70: Metal thin film | 100: Prism unit |
| 110: First prism | |
| 111: First prism-buffer solution interface | |
| 120: Second prism | |
| 121: Second prism-buffer solution interface | |
| 200: Microchannel structure | |
| 200a: First structure | 200b: Second structure |
| 200c: Micro-flow channel layer | |
| 210: Microchannel | 210a: Inflow passage |
| 210b: Outflow passage | 210c: Micro-flow channel |

-continued

DESCRIPTION OF REFERENCE NUMERALS

| | |
|---|---|
| 212: First inlet port | 214: Second inlet port |
| 216: First outlet port | 218: Second outlet port |
| 220: Support | |
| 300: Polarized light generating unit | |
| 310: Light source | 320: Polarizer |
| 330: Collimating lens | 340: Focusing lens |
| 350: First compensator | |
| 400: Polarized light detecting unit | |
| 410: Analyzer | 420: Photodetector |
| 430: Processor | 440: Second compensator |
| 450: Spectrometer | 500: Sample detection layer |
| 510: Substrate | 520: Dielectric thin film |
| 530: Adsorption layer | 600: Sample injection unit |
| 700: Blocking part | |

What is claimed is:

1. A split prism silicon-based immersion microchannel measuring device comprising:
   a microchannel structure including a support and one or more microchannels formed in the support and each having a sample detection layer with a fixed bioadhesive material for detecting a sample;
   a sample injection unit configured to inject a buffer solution containing the sample into the one or more microchannels;
   a prism unit having a first prism and a second prism and formed by connecting a vertical surface of the first prism and a vertical surface of the second prism;
   a blocking part disposed in a portion where the first prism and the second prism are connected to each other, the blocking part being configured to block an optical path;
   a polarized light generating unit configured to generate polarized light; and
   a polarized light detecting unit configured to detect a polarization change of reflected light,
   wherein the polarized light defines incident light that passes through the first prism and enters a first prism-buffer solution interface on which the first prism and the buffer solution adjoin each other,
   wherein a part of the incident light defines a first reflected light that passes through the first prism-buffer solution interface, is reflected by the sample detection layer, and passes through a second prism-buffer solution interface on which the second prism and the buffer solution adjoin each other,
   wherein another part of the incident light defines second reflected light that is reflected by the first prism-buffer solution interface, and
   wherein the second reflected light is absorbed, scattered, or reflected by the blocking part.

2. The split prism silicon-based immersion microchannel measuring device of claim 1, wherein the blocking part is a plate-shaped film, one surface of the blocking part adjoins the vertical surface of the first prism, and another surface of the blocking part adjoins the vertical surface of the second prism.

3. The split prism silicon-based immersion microchannel measuring device of claim 1, wherein the blocking part is made of metal having an extinction coefficient of 0.5 or more and a thickness 20 mm or less.

4. The split prism silicon-based immersion microchannel measuring device of claim 1, wherein the blocking part is made of plastic having a thickness of 20 mm or less.

5. The split prism silicon-based immersion microchannel measuring device of claim 1, wherein the blocking part is a portion where the vertical surface of the first prism having surface roughness and the vertical surface of the second prism having surface roughness adjoin each other.

6. The split prism silicon-based immersion microchannel measuring device of claim 5, wherein the vertical surface of the first prism and the vertical surface of the second prism each have surface roughness of 1 nm to 1 mm.

7. The split prism silicon-based immersion microchannel measuring device of claim 1, wherein a part of the incident light defines transmitted light that passes through the buffer solution and enters the sample detection layer at an incident angle that satisfies a p-polarized wave non-reflection condition, and the transmitted light defines the first reflected light that is reflected by the sample detection layer and then passes through the second prism-buffer solution interface.

8. The split prism silicon-based immersion microchannel measuring device of claim 1, wherein the sample detection layer comprises:

a substrate;

a dielectric thin film formed on the substrate; and an adsorption layer formed on the dielectric thin film, and wherein the bioadhesive material for detecting the sample is fixed to the adsorption layer.

9. The split prism silicon-based immersion microchannel measuring device of claim 8, wherein the substrate is made of one or more materials selected from silicon, a dielectric material, or a semiconductor.

10. The split prism silicon-based immersion microchannel measuring device of claim 8, wherein the polarized light detecting unit calculates a thickness or concentration of the sample absorbed by the adsorption layer based on a polarization change of the first reflected light.

11. The split prism silicon-based immersion microchannel measuring device of claim 1, wherein the polarized light generating unit adjusts a light amount of the incident light entering the first prism and controls a shape of a beam spot of the incident light formed on the first prism-buffer solution interface.

12. The split prism silicon-based immersion microchannel measuring device of claim 1, wherein the sample injection unit injects gas, instead of the buffer solution, into the one or more microchannels to measure a biomarker contained in air or the gas.

13. The split prism silicon-based immersion microchannel measuring device of claim 12, wherein when the gas is injected into the one or more microchannels, the polarized light defines incident light that passes through the first prism and enters a first prism-gas interface on which the first prism and the gas adjoin each other, and a part of the incident light defines the first reflected light that passes through the first prism-gas interface, is reflected by the sample detection layer, and passes through a second prism-gas interface on which the second prism and the gas adjoin each other.

14. A split prism silicon-based immersion microchannel measuring method using the split prism silicon-based immersion microchannel measuring device of claim 1, the split prism silicon-based immersion microchannel measuring method comprising:

injecting, by the sample injection unit, a buffer solution into the microchannel structure including at least one microchannel having the sample detection layer with the fixed bioadhesive material for detecting the sample;

adsorbing the sample contained in the buffer solution to an antibody of the sample detection layer, generating polarized light by the polarized light generating unit;

allowing the polarized light to define incident light that passes through the first prism and enters the first prism-buffer solution interface on which the first prism and the buffer solution adjoin each other, allowing a part of the incident light to define transmitted light that passes through the buffer solution and enters the sample detection layer at an incident angle that satisfies a polarized wave non-reflection condition and allowing another part of the incident light to define the second reflected light that is reflected by the first prism-buffer solution interface;

allowing the transmitted light to define first reflected light that is reflected by the sample detection layer, passes through the second prism-buffer solution interface, on which the second prism and the buffer solution adjoin each other, and passes through the second prism and removing the second reflected light by the blocking part provided in a portion where the first prism and the second prism adjoin each other, detecting, by the polarized light detecting unit, a polarization change of the first reflected light; and detecting concentration of the sample adsorbed to the sample detection layer based on the polarization change of the first reflected light, wherein the second reflected light is absorbed, scattered, or reflected by the blocking part such that only the first reflected light reflected by the sample detection layer is selectively detected.

* * * * *